(12) United States Patent
Panzer et al.

(10) Patent No.: US 7,572,551 B1
(45) Date of Patent: Aug. 11, 2009

(54) ELECTRODE ACTIVE BLANKS AND METHODS OF MAKING

(75) Inventors: Brian Panzer, Williamsville, NY (US); William Thiebolt, III, Tonawanda, NY (US)

(73) Assignee: Greatbatch Ltd., Clarence, NY (US)

( * ) Notice: Subject to any disclaimer, the term of this patent is extended or adjusted under 35 U.S.C. 154(b) by 667 days.

(21) Appl. No.: 11/274,651

(22) Filed: Nov. 15, 2005

Related U.S. Application Data

(60) Provisional application No. 60/694,426, filed on Jun. 27, 2005.

(51) Int. Cl.
*H01M 4/62* (2006.01)
*C04B 35/00* (2006.01)
*H01M 4/58* (2006.01)

(52) U.S. Cl. .................. 429/217; 264/104; 264/105; 429/218.1

(58) Field of Classification Search .............. None
See application file for complete search history.

(56) References Cited

U.S. PATENT DOCUMENTS 3,736,185 A * 5/1973 Smatko .............. 429/252
4,556,618 A * 12/1985 Shia .................. 429/217
4,758,473 A 7/1988 Herscovici et al.
5,543,249 A 8/1996 Takeuchi et al.
6,174,622 B1 1/2001 Thiebolt, III et al.
6,368,365 B1 4/2002 Chi et al.
6,416,904 B1 7/2002 Reimers et al.
6,582,545 B1 6/2003 Thiebolt, III et al.
2005/0064290 A1* 3/2005 Panzer et al. ............. 429/218.1

OTHER PUBLICATIONS

W.S. Tyler Product and Price Catalog, 2006.*

* cited by examiner

*Primary Examiner*—Dah-Wei D Yuan
*Assistant Examiner*—Edu E Enin-Okut
(74) *Attorney, Agent, or Firm*—Michael F. Scalise (57) ABSTRACT

Improved methods for manufacturing electrode active tapes, including blanks/plates with essential homogeneity for consistently more reliable performing electrodes for electrochemical cells, and with lower rates of off-specification material, by forming an electrode active mixture; adjusting the solids content to form a filter cake mix; crumbling the filter cake into particles and performing at least one calendering step at a calendering station having a nip zone while applying a force to the particles axially with the direction of movement of the particles to compact the particles in the nip zone for more even presentation during calendering.

27 Claims, 8 Drawing Sheets

ELECTRODE ACTIVE BLANKS AND METHODS OF MAKING

CROSS REFERENCE TO RELATED APPLICATION

This application claims the benefit of U.S. Provisional Application 60/694,426, filed Jun. 27, 2005.

TECHNICAL FIELD

This invention relates generally to electrodes for electrochemical cells, and more specifically, to electrode active tapes, blanks, plates, including improved methods and devices for manufacturing, and electrochemical cells equipped with electrodes fabricated therewith.

BACKGROUND OF THE INVENTION

Electrochemical cells, such as batteries for hearing aids, and especially for implantable devices, like cardiac pacemakers are required to meet high performance specifications and reliability. In the fabrication of components for such batteries, electrodes, including anodes and cathodes, are fabricated, at least in part, from electrode active blanks and plates formed from tapes.

While methods for manufacturing electrode active tapes, blanks and plates are well established, seemingly minor variations in such methods can result in electrodes which fail to meet performance specifications.

One patent of interest in the field of electrodes and batteries as power sources for hearing aids and cellular telephones is U.S. Pat. No. 6,368,365 to Chi et al. This patent discloses methods for making cathodes by blending a catalyst, carbon, a fibrillatable material and lubricant. The process includes the step of extruding the blend to form an extrudate which is then calendered under heat to reduce the thickness of the extrudate. This can result in a separation of the phases, i.e., separation of the solvent/lubricant from particulate/solids of the composition.

U.S. Pat. No. 6,174,622 to Thiebolt, III et al., which is assigned to the assignee of the present invention and incorporated herein by reference, describes the production of low basis weight electrode structures by subjecting an electrode active mixture to a secondary calendering step performed in a direction, reverse or orthogonal to that used to form the initial sheet tape. Calendering in an orthogonal or reverse direction from the initial direction fibrillates the fluoropolymeric binder. This permits the spread of binder in transverse directions to lower the basis weight of the electrode active structures or blanks.

U.S. Pat. Nos. 5,435,874 and 5,571,640, both to Takeuchi et al., also assigned to the assignee of the present invention and incorporated herein by reference, are directed to processes for manufacturing free standing sheets of cathode material. The preferred cathode active materials described in the Takeuchi et al patents are silver vanadium oxide (SVO) and copper silver vanadium oxide (CSVO). These materials are coupled with a lithium anode and activated by a nonaqueous electrolyte to provide high energy density cells. Such cells are particularly useful as power sources for implantable medical devices, such as cardiac defibrillators.

The processes of Takeuchi et al involve first adjusting the particle size of the cathode active material to a useful size, followed by mixing with binder and conductivity enhancing additives suspended in solvent/lubricant to form a paste. The paste is then fed to a series of roll mills that calender it into a free standing sheet having thicknesses ranging from about 0.004 inches to about 0.020 inches.

Takeuchi et al., teach an alternative method, wherein the paste is first pelletized before being calendered. The resulting cathode sheet material is dried and formed into blanks that are subsequently engaged with a current collector to form an electrode.

While the methods of Takeuchi et al possess merit, it was observed that pelletization can result in the formation of off-specification materials, wherein electrode active sheets and tapes lack required consistency, which could be observed at the macro level. This is believed to be caused by compressed pellets meshing inconsistently and developing flaws in the blanks during the sheet forming process. This lack of essential homogeneity alters battery performance, especially the predictability of battery life expectancy. Hence, batteries manufactured using electrodes, especially those prepared from pelletized feedstock often fail to meet manufacturers performance specifications.

Accordingly, there is a need for improved processes for manufacturing electrode active materials, and especially alternatives to pelletized materials for making more reliable homogeneous electrode active tapes and blanks for use in cathodes and anodes for electrochemical cells.

SUMMARY OF THE INVENTION

In accordance with one aspect of the invention, there are provided novel free standing sheets in the form of electrode tapes, from which electrode blanks or plates are fabricated, for use in the production of more reliable components for electrochemical cells, such as electrodes for batteries, like those used as power supplies for implantable medical devices, like cardiac pacemakers, and for other medical devices, e.g., defibrillators, and so on.

As a further aspect of the invention, improved methods are provided for manufacturing the electrode active tapes, including blanks/plates with essential homogeneity for consistently more reliable performing electrodes for electrochemical cells, and with lower rates of off-specification material.

Generally, the methods of the invention include the steps of:

a) blending a composition of at least an electrode active material, a conductive diluent, a binder and a lubricant to form an electrode active mixture;

b) adjusting the solids content of the electrode active mixture to form an intermediate product having the consistency of a filter cake;

c) crumbling the filter cake into particles, and d) performing at least one calendering step of the particles at a calendering station having a nip zone while applying a force to the particles axially with the direction of movement of said particles to compact the particles in the nip zone.

Accordingly, these inventors discovered that crumbling the filter cake into particulates, and avoiding the customary pelletization step, in combination with force feeding the particulates to compact them in the nip zone of a calendering mill provide electrode active sheet/tape materials possessing smooth, physically consistent properties, free or virtually free of striations and other surface imperfections and irregularities.

The electrode active mixture of the invention will have at least one electrode active material suitable for use as cathodic and/or anodic materials, such as metals, metal sulfides, metal oxides and mixtures of the same. At least one carbonaceous material may be employed as a conductive diluent. Fluorinated polymers may be used as binder, and a suitable organic solvent as lubricant. The blended electrode active mixture typically will have the consistency of a paste having a solids content generally about 75 percent.

The invention especially features methods of manufacture employing an improved sequence of steps in the production of electrode sheets and tapes, wherein the solvent content of the foregoing paste is reduced to a consistency of a high solids content filter cake (about 85% solids, for example). Rather than pelletizing, the filter cake is crumbled, either manually or mechanically converting the cake into particulates, such as by a sieving operation. Serendipitously, these inventors discovered that during initial calendering, by force feeding the crumbled particles by applying force exceeding that of normal gravity, e.g., compressing the particles vertically, for example, in a downward directly into the nip zone of calendering rolls provides a more even presentation of the material for calendering purposes. The crumbled particles compacted into the nip of the calendering rolls provides sheets/tapes with a statistically higher degree of consistency and uniformity in physical properties, free or virtually free of random surface imperfections or irregularities, such as striations, compared to sheets formed from pelletized particles, or sheets formed wherein the force applied to the feed is the equivalent of normal gravity.

As a further aspect of the improved methods for manufacturing the electrode active tapes of this invention, these inventors also developed a novel apparatus especially adapted for use in the initial calendering of the crumbled electrode active material.

Therefore, a further object of the invention provides for a calendering apparatus useful in forming electrode active tapes characterized by a high level of homogeneity and consistency.

The apparatus, which is especially useful in primary calendering of the crumbled/particulate material, comprises a chute having a tubular sidewall defining a hollow interior with first and second ends. The chute interior is adapted for receiving the crumbled/particulate material. A power operated ram for applying force to the crumbled material in the chute is positioned in proximity to the first end of the chute. The power operated ram is axially driven in the chute interior and applies a force to the particles, compressing the particulate material directly into the nip of the calendering rolls with continuous pressure.

In addition to the primary calendering step, the invention also contemplates a secondary calendering step wherein the sheet or tape is further calendered in a reverse or orthogonal direction to that of the primary calendering step, and optionally, a ternary calendering step by further rotation of the blank or tape 180° to coincide with the primary calendering direction and further rotated bottom over top before final calendering.

In addition to the more reliable sheets, tapes, blanks/plates, methods of manufacture, including apparatus, it is yet a further aspect of the invention to provide for novel electrodes and methods of making which include the steps of:

a) blending a composition comprising an electrode active material, a conductive diluent, a fluoropolymeric material as a binder, and a lubricant to form a paste;

b) increasing the solids content of the paste by removal of at least a portion of the lubricant to form a filter cake;

c) crumbling the filter cake into discrete particles;

d) calendering the particles in a first direction with the application of sufficient force to compress the particles in a nip zone of a calendering station for a more even presentation to provide a first structure having a first thickness;

e) calendering the first structure into a second structure having a second thickness less than the first thickness by calendering the first structure in a second direction with the first structure rotated bottom over top with respect to the orientation that formed the first structure, and f) contacting the second structure to at least one of a first and second major surfaces of a conductive substrate to form an electrode, either cathode or anode.

This method can also include the step of calendering the first structure into an intermediate structure before forming the second structure, the intermediate structure having an intermediate thickness less than the first thickness by contacting the electrode mixture in a direction substantially orthogonal to or in a reverse direction to that which formed the first direction.

In still a further aspect, the present invention contemplates improved electrochemical cells, e.g., batteries comprising at least a working electrode and counter electrode, wherein at least one of the working and counter electrodes comprises an electrode active blank prepared by a method comprising the steps of:

a) blending a composition comprising an electrode active material, a conductive diluent, a fluoropolymeric material, and a lubricant to form a paste;

b) increasing the solids content of the paste by removal of at least a portion of the lubricant to form a filter cake;

c) crumbling the filter cake into particles;

d) calendering the particles in a calendering station having a nip zone with the simultaneous application of compressive force to the particles to provide a first structure having a first thickness;

e) calendering the first structure into a second structure having a second thickness less than the first thickness by calendering the first structure in a second direction with the first structure rotated bottom over top with respect to the orientation that formed the first structure to form the electrode active blank, and f) contacting the electrode active blank to at least one of a first and second major surfaces of a conductive substrate to form the at least one working electrode or counter electrode.

BRIEF DESCRIPTION OF THE DRAWINGS

For a further understanding of the invention and its characterizing features reference should now be made to the accompanying drawings wherein.

DESCRIPTION OF THE PREFERRED EMBODIMENTS

Figure 1:
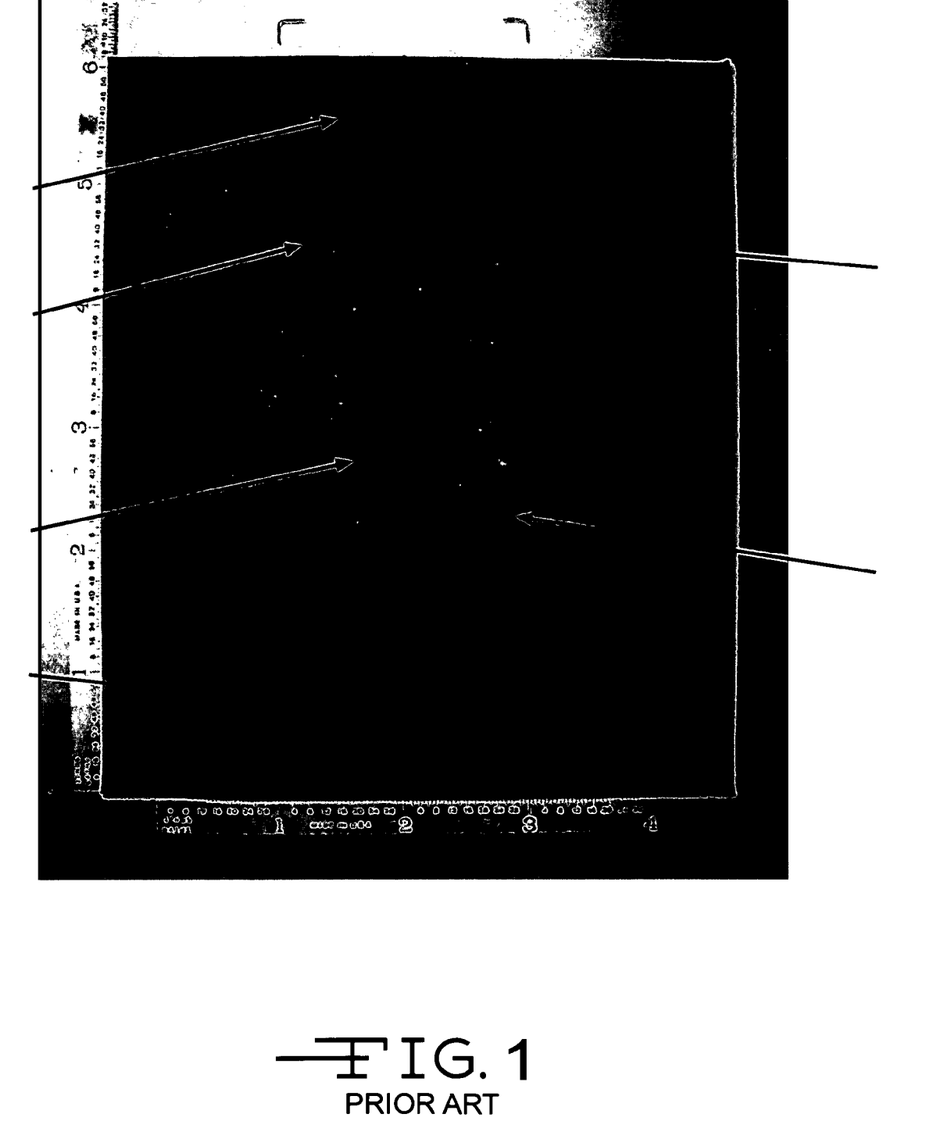
FIG. 1 illustrates an electrode active sheet prepared from a pelletized material with random irregularities, such as striations, and a general lack of consistency or homogeneity.

Turning first to FIG. 1, an electrode active sheet material is illustrated prepared from pelletized material according to methods known in the art. The sheet is highlighted to illustrate areas containing striations and other surface imperfections and irregularities believed to be the result of compressed pellets meshing inconsistently and developing flaws in the blanks during calendering steps.

Figure 2:
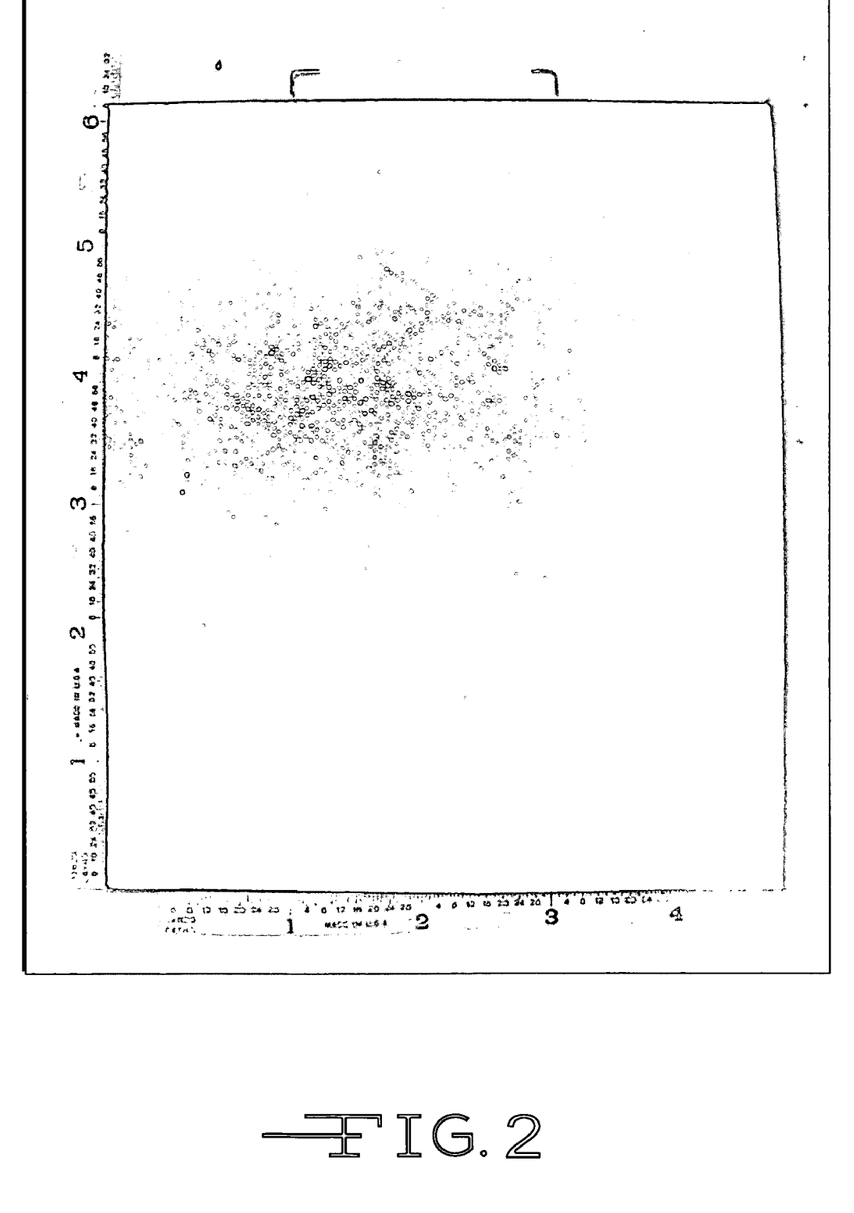
FIG. 2 illustrates an electrode active sheet material of the invention with a smooth, homogeneous consistency, free of striations and other irregularities.

By contrast, FIG. 2 illustrates an electrode active sheet material prepared according to methods of the present invention, wherein the sheet material is made from crumbled discrete particles from electrode active mixture that has been force fed to the nip zone of a calendering mill to provide electrode active sheet/tape materials possessing smooth, physically consistent properties, free or virtually free of striations and other surface imperfections and irregularities.

The methods of the present invention begin with an already prepared electrode active mixture. The starting electrode active material of the mixture is of the kind typically used as a cathode in a primary electrochemical cell, or as the cathode or anode of a secondary electrochemical cell, but not limited thereto. The method ultimately involves manufacturing a blank and then an electrode from the blank for subsequent use in an electrochemical cell, e.g., battery.

The electrode active material preferably comprises a metal, a metal sulfide, a metal oxide or mixtures thereof, e.g., various combinations, including a mixed metal oxide, preferably present in a granular form. Carbonaceous active materials are also useful as starting materials for forming electrode components by the process of the present invention.

Representative examples of electrode active materials that may be formed into a cathode for a primary cell according to the present invention include silver vanadium oxide (SVO), copper silver vanadium oxide (CSVO), manganese dioxide, carbon, fluorinated carbon, titanium disulfide, cobalt oxide, nickel oxide, copper vanadium oxide, and others typically used in lithium anode cells. The electrode active material for a secondary cell is preferably lithiated when the cell is manufactured and may or may not be used in combination with other metal oxide or metal sulfide materials. Lithiated materials are preferred because they are stable in air and readily handled. The more preferred oxides include $LiNO_2$, $LiMn_2O_4$, $LiCoO_2$, $LiCu_{0.92}Sn_{0.08}O_2$, $LiCO_{1-x}Ni_xO_2$ and mixtures thereof. Among these, lithium cobalt oxide is most preferred.

Figure 3:
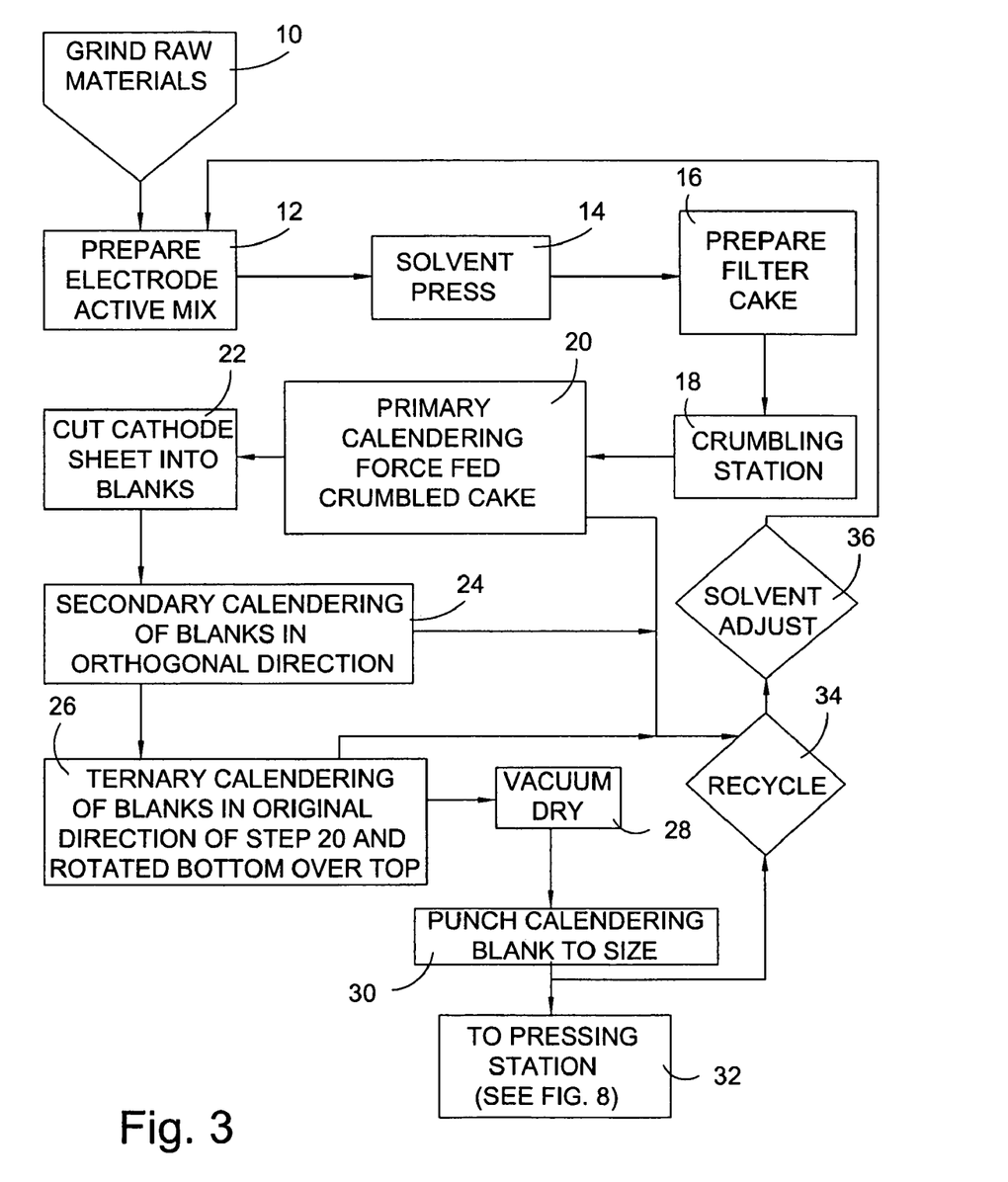
FIG. 3 is a block diagram and flow chart illustrating the sequence of steps in making an electrode active blank according to the present invention.

As illustrated in the block diagram flow chart of FIG. 3, methods of the invention start by taking granular electrode active material and adjusting the particle size to a useful range. This is done by comminuting the electrode active material in attrition or grinding step 10. A ball mill or vertical ball mill is preferred, and typical grinding times range from about 10 to about 15 minutes. The finely divided electrode active material, about 94 percent by-weight is preferably mixed with carbon black and/or graphite as conductive diluents and a fluororesin powder, such as polytetrafluoroethylene (PTFE) powder, as a binder material to form a depolarizer admixture in the step designated 12. Preferably, the admixture comprises about 2 weight percent of the conductive diluent, and about 3 weight percent of the binder material, and a solvent, as the balance. This is typically a solvent of either water or an inert organic medium, such as mineral spirits, Isopar® G, a preferred solvent available from Exxon-Mobil. The mixing process provides for fibrillation of the fluoropolymer to ensure material integrity. In some cases, no conductive diluent may be required. In any event, the electrode active mixture of step 12 contains about 75 percent by-weight solids. After mixing sufficiently to ensure homogeneity, the active admixture is removed from the mixer as a paste and placed in a solvent press 14 to remove sufficient solvent to convert the electrode active paste to the consistency of a filter cake 16, and thereby increase the solids content to about 75 percent to about 85 percent by-weight.

The filter cake is then transferred to station 18 where the cake is crumbled into particles of various sizes, dimensions and states of subdivision. The crumbling of the cake into particles of substantially uniform sizes, or distribution of sizes, at least at this stage, does not appear to be critical to final product consistency and homogeneity. Advantageously, the invention contemplates a crumbling operation which can be performed manually without tools, and using the hands, or with a device, such as a manually operated sieve, or equivalent device.

However, for greater efficiency crumbling the filter cake is preferably performed using size reduction equipment and machinery of known design for transforming the cake into particles of uniform size, or discrete particles with a distribution of sizes. Generally, the distribution of sizes can range from larger, coarse size particles generated with sieves having lower mesh numbers, e.g., 5-9 with larger size openings retaining a relatively small percentage of the initial crumbled feed, and with most of the particles (>90 percent) passing through the screen openings for further size reduction, i.e., to medium size particles. That is, most of the particles passing through the coarse mesh screens are treated in one or more additional size reduction steps using sieves having intermediate mesh sizes, e.g., 10-15, with medium size openings to retain up to about 35 percent of the original feed. The balance of the particles passing through the medium mesh screens can undergo further size reduction with sieves having higher mesh numbers and still smaller size openings, e.g., 16-18, wherein the balance of the particles are reduced to finer sizes, and so on.

The filter cake can be readily crumbled into discrete particles of suitable size or distribution of sizes for this invention using known, commercially available size reduction equipment. In this regard, those machines found to be especially reliable in crumbling the filter cake utilize interchangeable sieves of various sizes of openness capable of producing particles ranging from very coarse to very fine sizes. Those mechanical size reduction sieves with tapered apertured, frusto-conically shaped walls with adjustable impeller are especially useful in forming the desired discrete particle sizes.

Representative commercially available size reduction machines for crumbling the filter cake include those available from Quadro Engineering, Inc., Waterloo, Canada under the name "Comil", such as model 197S. Details of such machines are disclosed in U.S. Pat. Nos. 4,759,507 and 4,768,722, the contents of which are incorporated-by-reference herein. Other similar type machines are also commercially available from The Fitzpatrick Company, Elmhurst, Ill., under the FitzMill® and Fitzsieve® trademarks. Details of the machines are disclosed in U.S. Pat. No. 6,367,723, the contents of which are incorporated-by-reference herein.

Following the crumbling operation 18, the particles of the electrode active mixture are transferred to a primary calendering station 20 comprising a calendering mill. In transporting the crumbled feed for initial calendering, force is applied to the crumbled particles axially with the direction of flow to the rolls. It is believed that physically compressing the crumbled particles in the primary calendering step in the direction of the calendering rolls results in a more even presentation of the crumbled feed to the nip zone of the rolls for more reliable tapes having smoother, more uniform mass consistencies, free or virtually free of striations associated with tapes formed from gravity fed electrode active materials.

It was also found that tapes prepared from pelletized electrode active mixtures, when presented to calendering rolls under similar pressurized conditions resulted in pellet remnants and inconsistencies, e.g., striations in the calendered material.

The primary calendering operation wherein the crumbled cake feed is presented to the calendering rolls by force feeding means, in place of simple gravitational feeding of the crumbled cake mix, may be performed in the calendering mill station illustrated in FIGS. 4-7.

Figure 4:
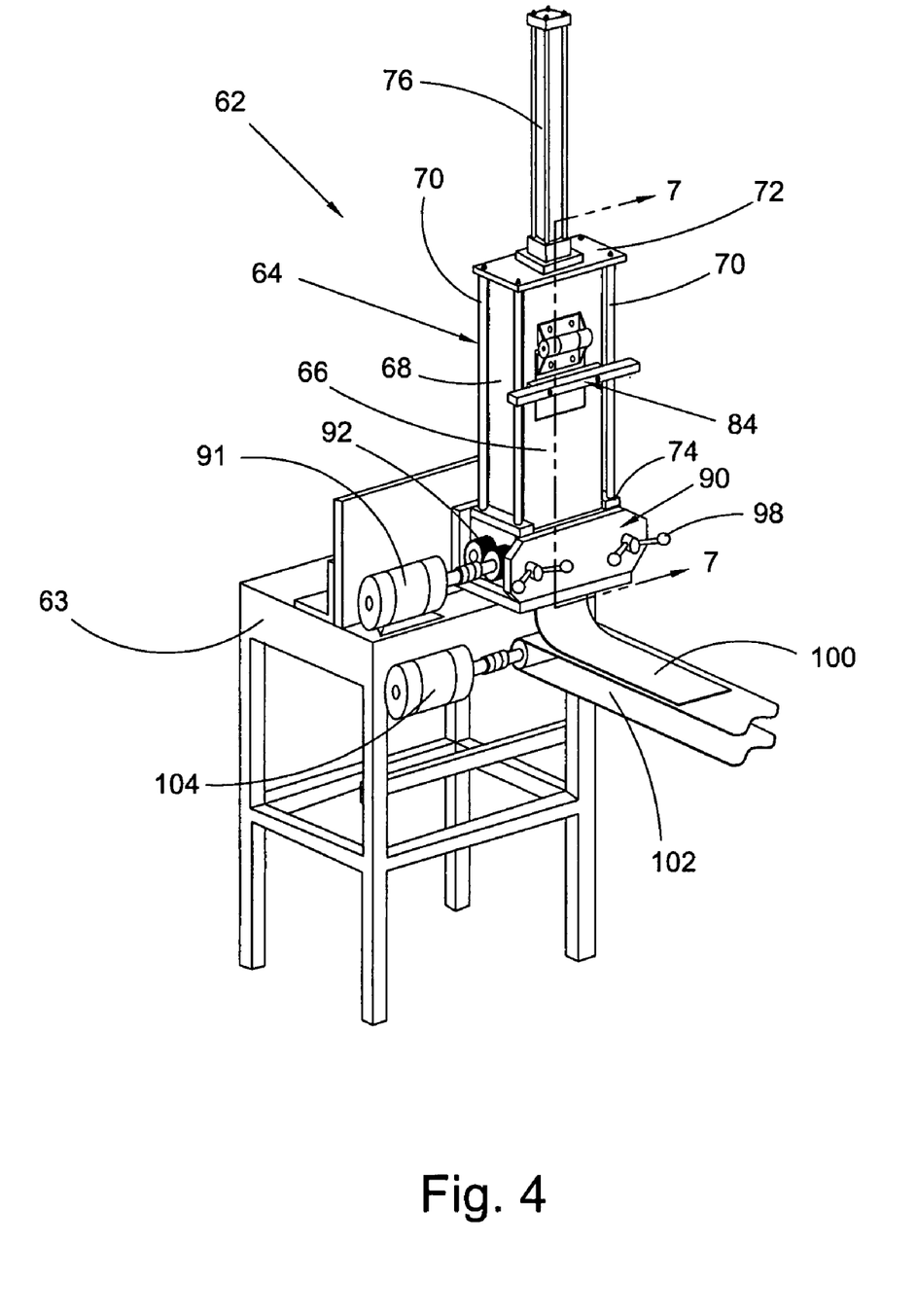
FIG. 4 is an isometric view of a force feed calendering mill used in forming electrode tapes and blanks of the present invention.
Figure 5:
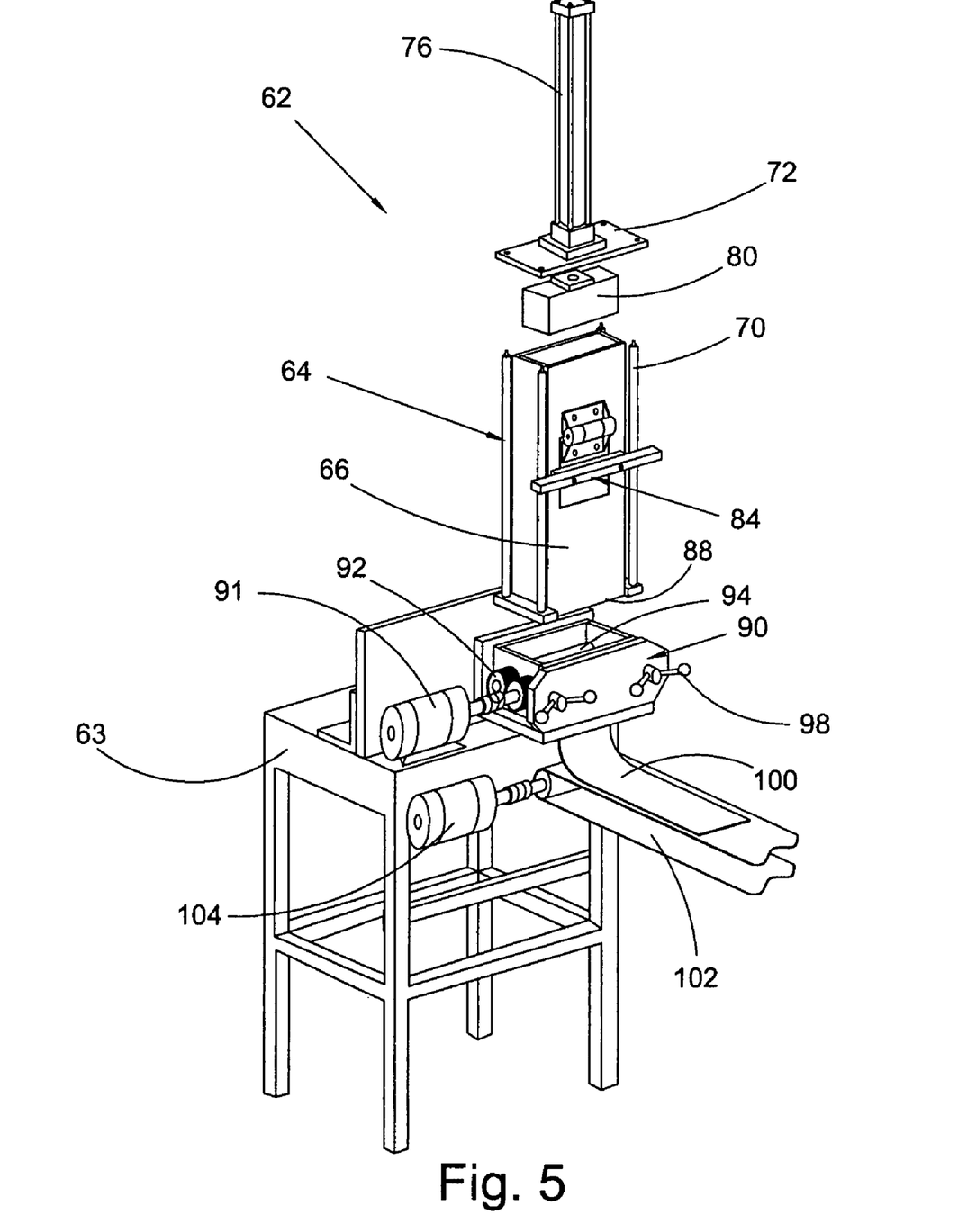
FIG. 5 is an exploded view of the force feed calendering mill of FIG. 4.

Force feed calendering mill 62 mounted on station support 63 comprises a chute 64 for receiving crumbled electrode active mixture 82 (FIG. 6) for calendering. Chute 64 is a tubular body having a generally rectangular configuration with front walls 66 and side walls 68. Rectangular chute 66 may have a square cross-sectional configuration wherein the front walls 66 and side walls 68 are dimensionally equal, or alternatively, rectangular wherein the front walls 66 are dimensionally larger than side walls 68.

The walls 66 and 68 of the chute may be fabricated of virtually any rigid metallic or plastic sheeting material, and combination thereof, the plastics comprising higher molecular weight polymeric resins, such as PVC, polycarbonates, polyesters, polyamides, polyolefins, e.g., polypropylene, and so on. The chute is preferably reinforced with corner rod supports 70 affixed to end cap 72 at the upper first end, and cross members 74 at the lower second end. A pneumatic cylinder 76, or other equivalent drive means, is affixed to end cap 72. Cylinder 76 includes a drive shaft 78 (FIG. 6) engaged to ram/compacter 80 for axial translation through interior 81 of chute 64 for applying compacting force to crumbled feed 82. Chute 64 includes a feed hatch 83 in front wall 66, a door 84 for the feed hatch with a spring loaded hinge 86 for retaining the door in a closed position during compaction of crumbled feed 82.

Figure 6:
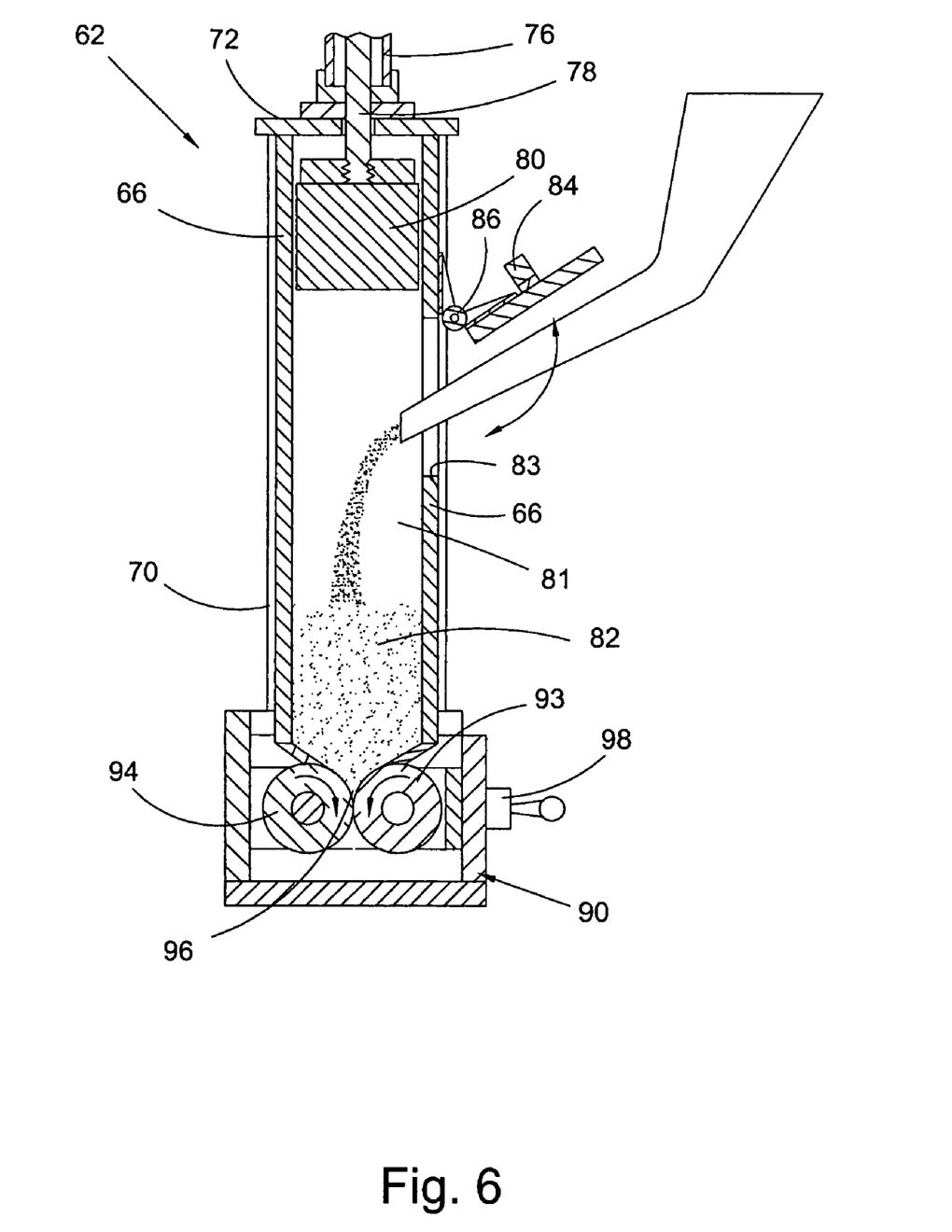
FIG. 6 is a sectional side elevational view of the force feed calendering mill with the side filling hatch open for receiving crumbled particulates of a cake mix for force feeding to the calendering rolls.
Figure 7:
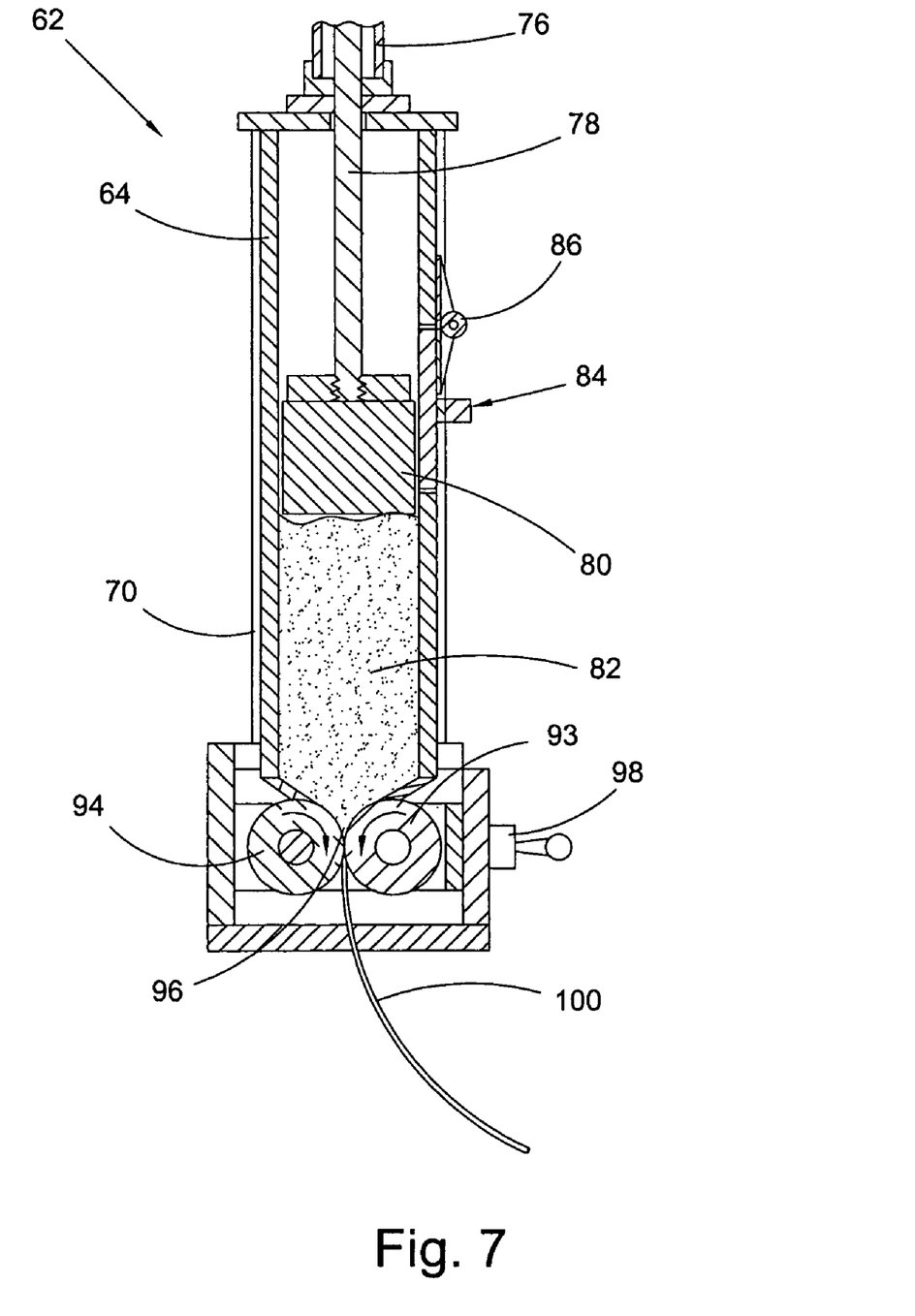
FIG. 7 is a side sectional view of the force feed calendering mill taken along line 7-7 of FIG. 4.

The lower second end 88 of chute 64 is open ended for transmission of compressed and compacted crumbled feed 82 directly into nip zone 96 of mill 90, wherein motor 91 through pulleys 92 turn rolls 93 and 94, so they rotate counter to one another, and engage crumbled material 82 in nip 96. Actuation of the cylinder drive 76 applies sufficient force to ram 80 to compact the particles loaded in the chute. Pressure from cylinder 76 and ram 80 applies a compacting force to the crumbled material 82 generally in the range from about 20 to about 100 psig. The nip 96 of the calendering rolls can be adjusted by rotation of mill keys 98-99, for example, to a gap of about 0.02 inch.

Tape 100 coming off mill 90 can be delivered to motor 104 driven conveyor belt 102 for further milling, and/or other processing.

Typically, the first calendering step 20 (FIG. 3) is performed by two to four calenderings that serve to press the admixture between rotating rollers to provide a free standing sheet of the active material as a continuous tape. The outer edges of the tape leaving the rollers are trimmed and the resulting tape is cut into blanks or plates 22.

Alternatively, the process includes the dropwise addition of a liquid electrolyte into the active mixture prior to the initial calendering step 20 to enhance the performance and rate capacity of an assembled electrochemical cell incorporating the active material.

The primary-calendered blanks 22 are further subjected to a secondary calendering step 24 to fibrillate the fluoropolymeric binder material in a second direction, other than the first direction. Preferably, the secondary calendering direction 24 is either orthogonal to or reverse to that which formed the free standing sheet in step 18. However, in a broader sense the secondary calendaring step 24 is in any direction other than the first direction, and provides secondary-calendered blanks having a second thickness less than the first thickness.

The secondary-calendered blanks 24 can then be subjected to a ternary calendaring step 26. In step 26, the secondary-calendered blanks are preferably rotated 180° with respect to the direction the electrode admixture traveled when it entered the first calendaring step 20. The secondary-calendered blanks 24 are further rotated 180° into a bottom over top orientation. It is believed that when the electrode active admixture is calendered in a single direction to form the sheet (step 20) the binder is fibrillated to an extent near its maximum tensile strength. If the electrode active blanks are calendered in a secondary direction (step 24), the active admixture spreads in directions other than, and preferably transverse to the initial direction. Additionally, by calendaring the secondary-calendered blanks in the third direction rotated 180° from that which the electrode admixture was oriented when it was initially calendered, and in a bottom over top orientation, the resulting ternary-calendered blanks have a higher surface area and a lower basis weight than the sheet material and the secondary-calendered blanks formed from the primary and secondary calendering steps, respectively. In a broader sense, however, the secondary-calendered blanks 24 can be rotated in any direction that is not the same as the first direction. The electrode active admixture can be oriented to form the free standing sheet in step 20, but in a bottom over top orientation. Typically, the range of thicknesses for the ternary-calendered blanks is from about 0.004 inches to about 0.020 inches.

The ternary-calendered blanks 26 are subsequently subjected to a drying step 28 under vacuum conditions. The drying step 28 serves to remove any residual solvent and/or water from the active material of the ternary-calendered blanks. The ternary-calendered blanks can be stored for later use, or punch calendered blanks to size at step 30, and sent to pressing station 32, where electrode components are formed.

As further shown in FIG. 3, the method of the present invention contains several feedback loops that recycle electrode active material should quality control not be up to an acceptable level. This contributes to process yield, as very little active material is actually lost to waste. After the active admixture is pressed during step 20 by the first calender mills, if the resulting tape is too thin or otherwise of insufficient quality, the tape is sent to a recycler, indicated as step 34. This reintroduces the active admixture into the feed line entering the calender mills. If needed, the solvent concentration is adjusted during step 36 as needed, to provide a more uniform consistency to the admixture paste for rolling into the tape in step 20 and for subsequently forming the blanks in steps 22 and 26. This first recycle step 34 is also useful for reintroducing trimmings and similar leftover active material back into the feed line entering the calendar mills.

A second recycle loop removes the active material from the process after the secondary calendering step 24 and feeds back into the first calendar mill 20, through the recycler indicated in step 34. Again, the solvent concentration is adjusted during step 36 to produce a paste and filter cake 16 that is suitable for rolling into a tape 20, and that is subsequently processed into the secondary-calendered blanks 24 and, ultimately, the ternary-calendered blanks 26, according to the present invention.

The punching operation 30 serves to cut the ternary-calendered blanks into a variety of shapes including strips, half-round shapes, rectangular shapes, oblong pieces, or others, that are moved during step 32 to the pressing stations (FIG. 8) for fabrication of an electrode component for use in a high energy density electrochemical cell, as will presently be discussed in detail.

Figure 8:
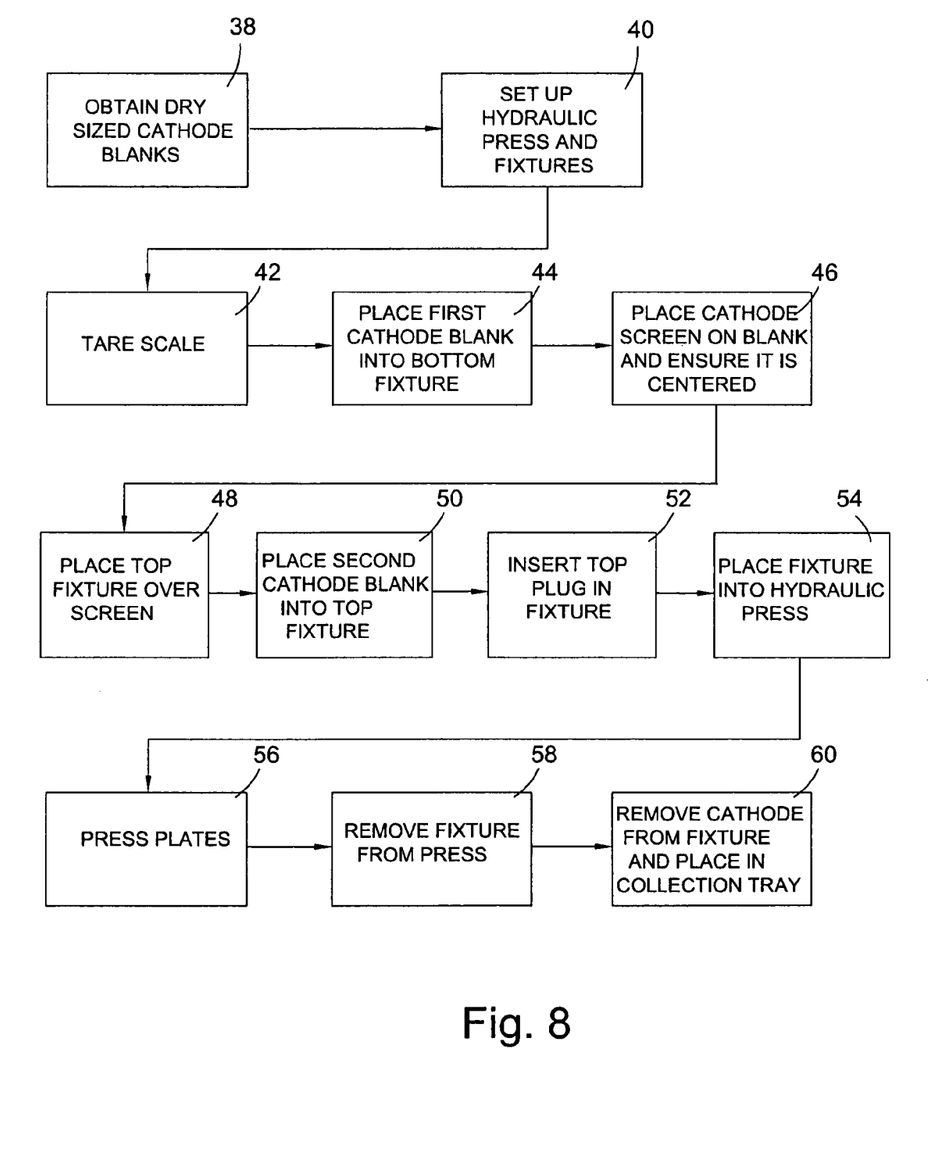
FIG. 8 is a block diagram and flow chart illustrating the sequence of steps in manufacturing an electrode component for use in an electrochemical cell from a blank of electrode active material made according to FIG. 3.

As illustrated in the block diagram flow chart shown in FIG. 8, during the electrode pressing process, dry ternary-calendered electrode blanks from step 30 (FIG. 3) are obtained during step 38 for operation thereon. A hydraulic press having platens or fixtures is provided at 40. Receptacle cups for the punched electrode blanks are weighted on a tare scale during step 42 and, as a quality control check, selected ones of the blanks are weighted in insure cross-sectional uniformity.

To build a cathode component, a first ternary-calendered blank is placed in a bottom fixture during step 44 and a current collector, such as an expanded metal screen is placed on top of the blank during step 46. A top press fixture is then positioned on the bottom fixture and over the current collector screen, as indicated at 48. This fixture receives a second shaped ternary-calendered blank during step 50 followed by a top plug during step 52 that closes the fixture assembly. The fixture assembly is then inserted into the hydraulic press, as indicated at 54, which compresses the two electrode blanks together 56 with the current collector sandwiched therebetween to form the electrode component as a laminate.

Following pressing step 56, the fixture assembly is removed from the press during step 58 and the electrode component is separated from the press fixture and placed into a collection tray during step 60. The electrode component is stored for later use, or it is incorporated into a high energy density primary or secondary electrochemical cell, as is well known to those of ordinary skill in the art.

In that respect, a cathode component prepared by the method of the present invention can be used, for example, in a nonaqueous electrochemical cell as described in U.S. Pat. No. 4,830,940 to Keister et al., which patent is assigned to the assignee of the present invention and incorporated herein by reference. The electrochemical cell contains an anode of a metal selected from Group IA of the Periodic Table of Elements, including lithium, sodium, potassium, etc., preferably lithium, and their alloys and intermetallic compounds, for example Li—Si, Li—Ai, Li—B and Li—Si—B alloys and intermetallic compounds. The form of the anode may vary, but typically the anode is in the form of a thin sheet or foil of the anode metal, and a current collector having an extended tab or lead affixed to the anode sheet or foil.

In order to prevent internal short circuit conditions, the cathode is separated from the Group IA, IIA or IIIB anode material by a suitable separator material. The separator is of electrically insulative material, and the separator material also is chemically unreactive with the anode and cathode active materials and both chemically unreactive with and insoluble in the electrolyte. In addition, the separator material has a degree of porosity sufficient to allow flow therethrough of the electrolyte during the electrochemical reaction of the cell. Illustrative separator materials include fabrics woven from fluoropolymeric fibers including polyvinylidene fluoride, polyethylenetetrafluoroethylene, and polyethylenechlorotrifluoro-ethylene used either alone or laminated with a fluoropolymeric microporous film, non-woven glass, polypropylene, polyethylene, glass fiber materials, ceramics, a polytetrafluoroethylene membrane commercially available under the designation ZITEX (Chemplast Inc.), a polypropylene membrane commercially available under the designation CELGARD (Celanese Plastic Company, Inc.) and a membrane commercially available under the designation DEXIGLAS (C.H. Dexter, Div., Dexter Corp.).

A suitable electrolyte for a primary electrochemical cell has an inorganic, ionically conductive salt dissolved in a nonaqueous solvent. More preferably, the electrolyte includes an ionizable alkali metal salt dissolved in a mixture of aprotic organic solvents comprising a low viscosity solvent and a high permittivity solvent. In the case of an anode comprising lithium, the alkali metal salt is lithium based. Known lithium salts useful as vehicles for transport of lithium ions from the anode to the cathode include $LiPF_6$, $LiBF_4$, $LiAsF_6$, $LiSbF_6$, $LiClO_4$, $LiAlCl_4$, $LiGaCl_4$, $LiC(SO_2CF_3)_3$, $LiNO_3$, $LiN(SO_2CF_3)_2$, $LiSCN$, $LiO_3SCF_2CF_3$, $LiC_6F_5SO_3$, $LiO_2CCF_3$, $LiSO_3F$, $LiB(C_6H_5)_4$, $LiCF_3SO_3$, and mixtures thereof.

Low viscosity solvents useful with the present invention include esters, linear and cyclic ethers and dialkyl carbonates such as tetrahydrofuran (THF), methyl acetate (MA), diglyme, trigylme, tetragylme, dimethyl carbonate (DMC), 1,2-dimethoxy-ethane (DME), 1,2-diethoxyethane (DEE), 1-ethoxy,2-methoxyethane (EME), diethyl carbonate, ethyl methyl carbonate, and mixtures thereof. High permittivity solvents include cyclic carbonates, cyclic esters and cyclic amides such as propylene carbonate (PC), ethylene carbonate (EC), acetonitrile, dimethyl sulfoxide, dimethyl formamide, dimethyl acetamide, γ-valerolactone, γ-butyrolactone (GBL), N-methyl-pyrrolidinone (NMP), and mixtures thereof. In the present invention, the preferred anode is lithium metal and the preferred electrolyte is 0.8M to 1.5M $LiAsF_6$ or $LiPF_6$ dissolved in a 50:50 mixture, by volume, of propylene carbonate as the preferred high permittivity solvent and 1,2-dimethoxyethane as the preferred low viscosity solvent.

In secondary electrochemical systems, the anode or negative electrode comprises a material capable of intercalating and de-intercalating the alkali metal, and preferably lithium. A carbonaceous anode comprising any of the various forms of carbon (e.g., coke, graphite, acetylene black, carbon black, glassy carbon, pitch carbon, synthetic carbon, mesocarbon microbeads, and mixtures thereof), which are capable of reversibly retaining the lithium species, is preferred. Graphite is particularly preferred due to its relatively high lithium-retention capacity.

A typical secondary cell negative electrode is fabricated by mixing about 90 to 97 weight percent graphite with about 3 to 10 weight percent of a binder material. The binder is preferably a fluoro-resin powder such as polytetrafluoroethylene (PTFE), polyvinylidene fluoride (PVDF), polyethylenetetrafluoroethylene (ETFE), a polyamide or a polyimide, and mixtures thereof. This anode active admixture is contacted to a metallic current collector usually made from a thin foil of copper, nickel, and nickel-plated steel, stainless steel or titanium.

The positive electrode comprises at least one of the above-described cathode active materials mixed with a suitable conductive diluent including acetylene black, carbon black and/ or graphite. Metal powders of nickel, aluminum, titanium and stainless steel are also useful conductive diluents. The positive electrode further comprises a fluoro-resin binder, preferably in a powder form, such as PTFE, PVDF, ETFE, a polyamide or a polyimide, and mixtures thereof. The cathode active admixture is contacted to a metallic current collector usually made from a thin foil of copper, nickel, and nickel-plated steel, stainless steel or titanium.

The preferred electrolyte for the secondary cell includes an alkali metal salt dissolved in a quaternary, nonaqueous carbonate solvent mixture consisting of about 10% to about 50% ethylene carbonate, about 5% to about 75% dimethyl carbonate, about 5% to about 50% ethyl methyl carbonate and about 3% to about 45% diethyl carbonate, by volume. For a more thorough discussion of such an electrolyte, reference is made to U.S. Pat. No. 6,153,338 to Gan et al., which is assigned to the assignee of the present invention and incorporated hereby by reference.

The preferred form of the primary and the secondary electrochemical cell is a case-negative design wherein the anode/cathode couple is inserted into a conductive metal casing connected to the anode current collector, as is well known to those skilled in the art. A preferred casing material is titanium although stainless steel, mild steel, nickel, nickel-plated mild steel and aluminum are also suitable. The casing header comprises a metallic lid having an opening for the glass-to-metal seal/terminal pin feedthrough for the cathode electrode and an electrolyte fill opening. The cell is thereafter filled with the appropriate electrolyte solution and hermetically sealed such as by close-welding a stainless steel plug over the fill opening, but not limited thereto. The cell of the present invention can also be constructed in a case-positive design.

The following examples describe the manner and process of manufacturing an electrochemical cell according to the present invention, and they set forth the best mode contemplated by the inventors for carrying out the invention, but they are not to be construed as limiting.

EXAMPLE I

A mixture of silver vanadium oxide, carbon black, graphite, and PTFE in Isopar® G is prepared at a solid content of about 85%. The mix was hand-crumbled to less than about 10 mesh, and a second portion was pelletized using a Fitpatrick Chilsonator®. Each feed type is independently loaded to a polymeric feed chute like that of FIG. 4 of about 1×6×6 inches in dimension and forced into a calender nip using a 1×6×3 inch polymeric ram powered by a pneumatic cylinder with a 2.5 inch bore driven by 20 to 100 psig. The calenders turned at a rate of between 20 and 40 RPM. The resulting crumbled feed sheet has a smooth appearance with no areas of incomplete meshing of feed while the produced pellet feed sheet shows areas of inhomgeneity where pellets appear to mesh inconsistently in the sheet forming process.

EXAMPLE II

A mixture of silver vanadium oxide, carbon black, graphite and PTFE in Isopar G was made at a solids content of about 85%. The mix was hand-crumbled to less than about 10 mesh. The feed was loaded to a polymeric feed chute measuring about 2.5×6×14 inches and forced fed into a calender nip using 2.5×6×6 inch polymeric ram powered by a pneumatic cylinder with a ¾ inch bore driven by 60 psig. The calenders turned at 20 rpm. The sheets thus produced were dried. They appear smooth with no areas of incomplete meshing of feed.

What is claimed is:

1. A method for making an electrode tape, which comprises the steps of at least:
   a) blending a composition comprising an electrode active material, a conductive diluent, a binder and a lubricant to form an electrode active mixture;
   b) adjusting the solids content of the electrode active mixture to form a filter cake;
   c) crumbling the filter cake into particles of the electrode active mixture; and
   d) performing at least a primary calendering of the particles of the electrode active mixture at a calendering station by applying a compacting force to forcibly move the particles directly into a nip zone of adjacent calendering rolls to compact the particles of the electrode active mixture in the nip zone.

2. The method for making an electrode tape according to claim 1, wherein the electrode active material is suitable for use as a cathode and/or anode; the conductive diluent comprises at least one carbonaceous material; the binder comprises at least one fluoropolymer and the lubricant is an organic solvent.

3. The method for making an electrode tape according to claim 1 wherein the electrode active material is a member selected from the group consisting of a metal, a metal sulfide, a metal oxide and mixtures thereof.

4. The method for making an electrode tape according to claim 2, wherein the carbonaceous material is a member selected from the group consisting of a carbon black, graphite and mixtures thereof.

5. The method for making an electrode tape according to claim 2, wherein the fluoropolymer is PTFE.

6. The method for making an electrode tape according to claim 1, wherein the electrode active mixture comprises a sufficient amount of each of at least silver vanadium oxide and/or copper silver vanadium oxide, carbon black, graphite and an organic solvent.

7. The method for making an electrode tape according to claim 1, wherein crumbling of the filter cake into particles is performed by means of a sieving device.

8. The method for making an electrode tape according to claim 7, wherein the sieving device is a size reduction machine having at least a generally conically shaped or frusto-conically shaped screen and an impeller.

9. The method for making an electrode tape according to claim 1, wherein the particles of the electrode active material comprise an average sectional size of less than 0.4 inches.

10. The method for making an electrode tape according to claim 1, wherein the calendering station comprises at least a particle supply chute and adjacent calendering rolls, the supply chute including means for forcibly moving and compacting the particles of the electrode active mixture directly into the nip zone of the adjacent calendering rolls.

11. The method for making according to claim 1, including the step of cutting the electrode tape into blanks or plates.

12. The method according to claim 11, including performing at least a secondary calendering step of the blanks or plates in a reverse or orthogonal direction to that of the primary calendering step, and optionally, a ternary calendering step by further rotation of the blank or tape 180° to coincide with the primary calendering direction and further rotated bottom over top before final calendering.

13. An electrode tape prepared according to the method of claim 12.

14. A method for making an electrode from the electrode blank or plate of claim 12 which comprises the step of engaging at least one of a first and second major surfaces of a conductive substrate with at least one ternary calendered blank.

15. A method for making an electrode, which comprises the steps of:
   a) blending a composition comprising an electrode active material, a conductive diluent, a fluoropolymer material, and a lubricant to form a paste;
   b) increasing the solids content of the paste by removal of at least a portion of the lubricant to form a filter cake;
   c) crumbling the filter cake into particles;
   d) forming a first structure by calendering the particles of the electrode active mixture in a first direction at a calendering station by applying a compacting force to forcibly move the particles directly into a nip zone of adjacent calendering rolls to compact the particles of the electrode active mixture in the nip zone;
   e) calendering the first structure into a second structure having a second thickness less than the first thickness by calendering the first structure in a second direction with the first structure rotated bottom over top with respect to the orientation that formed the first structure, and
   f) contacting the second structure to at least one of a first and second major surfaces of a conductive substrate to form the electrode.

16. The method of making an electrode according to claim 15 including the step of calendering the first structure into an intermediate structure before forming the second structure, the intermediate structure having an intermediate thickness less than the first thickness by contacting the electrode active mixture in a direction substantially orthogonal to or in a reverse direction to that which formed the first structure.

17. The method of making an electrode according to claim 15 wherein the composition of step (a) comprises about 94 percent by-weight electrode active material, about 2 percent by-weight carbonaceous material as conductive additive, about 3 percent by-weight fluoropolymer binder, and about 1 percent by-weight lubricant.

18. The method of making an electrode according to claim 15 wherein the electrode active material is a member selected from the group consisting of a metal, a metal sulfide, a metal oxide and mixtures thereof.

19. The method of making an electrode according to claim 15 wherein the electrode active material is a member selected from the group consisting of carbon, fluorinated carbon, silver vanadium oxide, copper silver vanadium oxide, manganese dioxide, titanium disulfide, cobalt oxide, nickel oxide, copper vanadium oxide, $LiNO_2$, $LiMn_2O_4$, $LiCoO_2$, $LiCu_{0.92}Sn_{0.08}O_2$, $LiCO_{1x}Ni_xO_2$ and mixtures thereof.

20. The method of making an electrode according to claim 15 wherein the second structure of step (e) has a thickness in the range from about 0.004 inches to about 0.020 inches.

21. An electrode comprising an electrode active blank prepared from the electrode tape of claim 15 and contacted to a conductive substrate.

22. The method of claim 1 including applying the compacting force ranging from about 20 psig to about 100 psig.

23. The method of claim 15 including applying the compacting force ranging from about 20 psig to about 100 psig.

24. The method of claim 1 including crumbling the filter cake into particles of the electrode active mixture that pass through a sieve of a size from about 10 to about 15 mesh.

25. The method of claim 1 including crumbling the filter cake into particles of the electrode active mixture that pass through a sieve of a size from about 16 to about 18 mesh.

26. The method of claim 1 including crumbling the filter cake into particles of the electrode active mixture that pass through a sieve of a size less than about 10 mesh.

27. The method of claim 15 including crumbling the filter cake into particles of the electrode active mixture that pass through a sieve of a size less than about 10 mesh.

* * * * *